United States Patent Office 3,485,632
Patented Dec. 23, 1969

3,485,632
PHOTOGRAPHIC MATERIAL CONTAINING ANTI-HALATION OR FILTER DYE LAYER
Hans Ohlschlager, Cologne-Stammheim, and Oskar Riester, Leverkusen, Germany, assignors to Agfa-Gevaert Aktiengesellschaft, Leverkusen, Germany, a corporation of Germany
No Drawing. Filed Nov. 30, 1966, Ser. No. 597,865
Claims priority, application Germany, Dec. 10, 1965,
A 51,036
Int. Cl. G03c 1/06, 1/84
U.S. Cl. 96—84                  6 Claims

ABSTRACT OF THE DISCLOSURE

A light-sensitive photographic material having antihalation properties provided by a styryl dye produced by the condensation of a pyrazolone with alkyl mercapto benzaldehyde, which dye contains an acid group and a diffusion preventing radical. The dye is completely decolorized in customary photographic processing baths.

---

The present invention relates to photographic materials including a yellow anti-halation or filter layer which contains styryl dyes of pyrazolones and benzaldehydes.

According to common practice the rear side of photographic films is provided with a colored gelatin layer. That layer is intended to prevent curling of the film and furthermore to absorb, as completely as possible, light rays not absorbed by the emulsion layers during exposure, thus preventing the formation of halation by reflection. A further improvement can be achieved by applying the antihalation layer as a filter layer immediately under the emulsion layer and not to the rear side of the film.

Antihalation or filter dyes for photographic films must meet various conditions; for example, they must have the desired absorption properties and be capable of being bleached completely and irreversibly in the usual photographic processing baths. Furthermore, they should be readily soluble or dispersible in the photographic layers in a sufficient concentration. They must be fixed in their respective layers so that they do not migrate into the adjacent light-sensitive emulsion layers. Styryl dyes which are obtained by condensation of pyrazolones with N-substituted p-aminobenzaldehydes are of particular importance in this field. The introduction of a relatively long aliphatic chain into the dye molecule causes resistance to diffusion. Known dyes of this type are, however, of only limited utility since they are not completely decolorized when in photographic processing baths customarily employed so that it is necessary to subject the film to a subsequent treatment in a hydrazine hydrate solution. This, however, is not desirable since any additional bath complicates and delays processing.

It is among the objects of the invention, to provide for use in anti-halation layers or filter layers for photographic materials, dyes which do not suffer the above-mentioned disadvantages and which are photographically satisfactory, in particular as regards their ability to be washed or bleached out.

We now have found that styryl dyes produced by condensation of pyrazolones with alkyl mercapto benzaldehydes and which contain in the molecule an acid group and at least one radical which prevents diffusion, are especially suitable for use as antihalation dyes or filter dyes for photographic materials.

The dyes to be used according to the invention include those of the following formula:

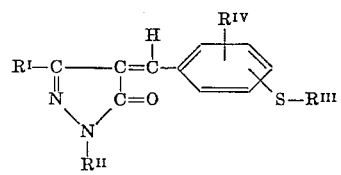

wherein represents:

$R^I$ = (1) alkyl radical containing up to 18 C-atoms which alkyl radical may be substituted by phenyl, halogen atoms such as chlorine or bromine, or by nitrile, hydroxy, alkoxy having preferably up to 5 carbon atoms such as methoxy or ethoxy, carboxyl, esterified carboxy or sulfo groups;
(2) aryl such as a radical of the phenyl or naphthyl series which can be substituted by alkyl having preferably up to 5 carbon atoms such as methyl or ethyl, sulfo, esterified carboxyl, heterocyclic radicals such as benzthiazolyl, amino, alkyl substituted amino, aryl substituted amino such as phenylamino, acyl substituted amino such as acetyl amino or heptadecanoyl amino etc.
(3) an amino group such as primary amino, alkyl substituted amino, aryl substituted amino such as phenylamino or acyl substituted amino, the acyl groups of which are preferably derived from an aliphatic carboxylic acid having up to 18 carbon atoms such as acetyl or stearoyl;
(4) carboxyl;
(5) carboxyl esterified, preferably with aliphatic alcohols having up to 18 carbon atoms or
(6) cycloalkyl preferably cyclopentyl or cyclohexyl;

$R^{II}$ = aryl such as a radical of the phenyl or naphthyl series which can be substituted by alkyl having preferably up to 5 carbon atoms such as methyl or ethyl, sulfo, carboxyl esterified carboxyl, heterocyclic radicals such as benzthiazolyl, amino, alkyl substituted amino, aryl substituted amino such as phenylamino, acyl substituted amino such as acetyl amino or heptadecanoyl amino etc.

$R^{III}$ = alkyl containing up to 18 carbon atoms which may be substituted by halogen such as fluorine, chlorine or bromine or by alkoxy having preferably up to 5 carbon atoms;

$R^{IV}$ = hydrogen, alkyl having preferably up to 5 C-atoms, alkylmercapto having up to 18 C-atoms, halogen such as chlorine or bromine, sulfo, alkoxy having preferably up to 18 C-atoms or phenoxy.

As will be clear from the above description the substituents of groups contained by the dyes used in accordance with the invention, especially the phenyl groups, can be substituted in any way desired. The properties can be varied with regard to absorption, solubility or diffusion resistance by means of suitable substituents. The only condition which one must observe in the choice of substituents is that the photographic properties of the material in which the dyes according to the invention are to be used must not be deleteriously affected. Water-soluble and diffusion-resistant dyes, especially those in which $R^I$ represents a branched alkyl radical having up to 12 C-atoms and $R^{IV}$ represents an alkyl-mercapto group or an alkoxy group are particularly preferred.

The following dyes have proved to be especially suitable:

I 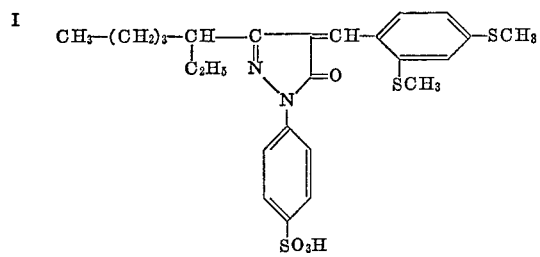

II 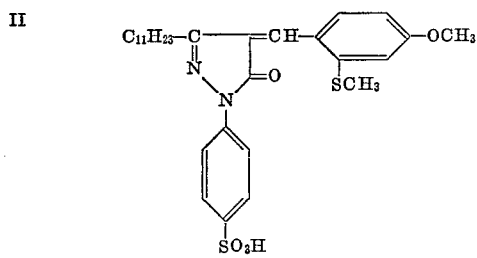

III 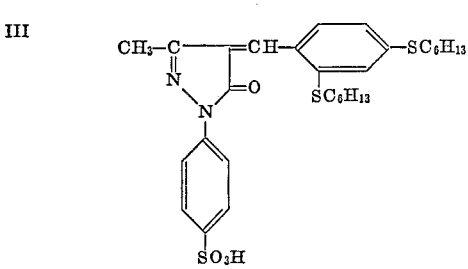

IV 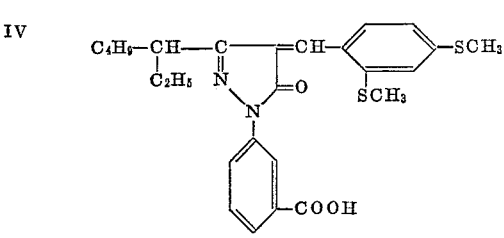

V 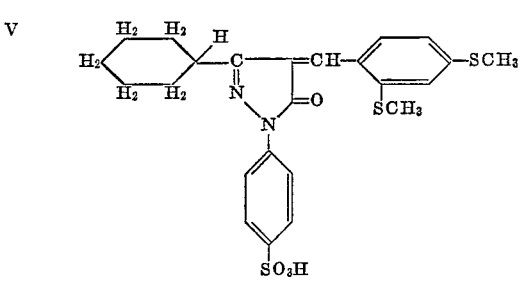

VI 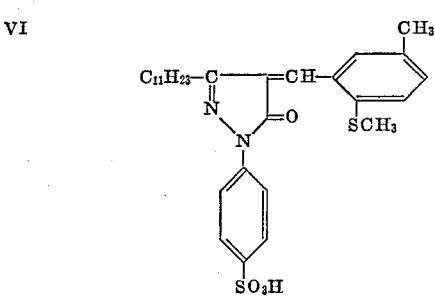

VII, VIII 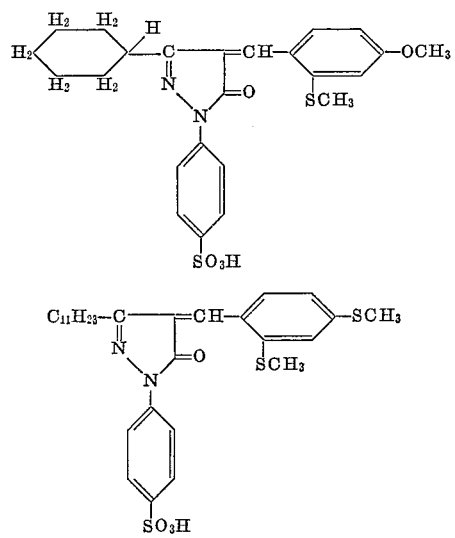

The dyes are prepared by condensation of the corresponding pyrozolones and aldehydes in glacial acetic acid or alcohol, if necessary with the addition of condensing agents such as pyridine or piperidine.

Examples of suitable pyrazolones are as follows: 1-(4'-sulfophenyl)-3-methyl-pyrazolone, 1 - (4' - sulfophenyl)-3 - undecyl-pyrazolone, 1 - (3' - carboxylphenyl)-3-cyclohexyl)-pyrazolone, 1-(4'-sulfophenyl) - 3 - lauroylaminopyrazolone.

Suitable alkyl thiobenzaldehydes are, for example, 2,4-bis-methylthio-benzaldehyde, 2-methylthio-5-methyl-benzaldehyde, 2-methylthio - 4 - methoxy - benzaldehyde, 2,4-bis-hexylthiobenzaldehyde, 2,4 - benzylthio-benzaldehyde. These aldehydes can easily be prepared by the process of Vilsmeier and Haak (Ber. 60, page 119) from the corresponding alkylaryl-thio-ethers using phosphoric oxychloride and dimethyl formamide or N - methylformanilide with or without the use of solvents.

Dyes I to III are prepared as follows, other dyes of the type according to the invention are prepared an analogous manner:

DYE I 10 g. of 1-(4'-sulfophenyl)-3-ethylamyl-pyrazolone and
6.5 g. of 2,4-bis-methylthiobenzaldehyde are refluxed for 30 minutes with
2.5 g. of piperidine in
40 cc. of ethyl alcohol. The dye precipitates on cooling as the piperidinium salt in the form of yellow needles. Recrystallized from isopropanol M.P. 164–167° C.

The required 2,4-bis-methylthiobenzaldehyde may be prepared as follows:

114 g. of benzene-1,3-bis-methylthioether are added dropwise, with stirring, at room temperature to a mixture of
62 cc. of phosphoric oxychloride and 94 g. of N-methyl formanilide and the mixture is then heated to 60° C. for four hours and poured onto ice. The crude aldehyde is filtered off under suction and recrystallized from isopropanol. M.P. 62–64° C.

DYE II 10 g. of 1-(4'-sulfophenyl)-3-undecyl-pyrazolone and
6.5 g. of 2-methylthio-4-methoxy-benzaldehyde (M.P. 57° C. B.P.$_{.2\,mm.}$ 135° C.) are heated on a steam bath for 2 hours in
70 cc. of glacial acetic acid with the addition of
7 cc. of piperidine. After cooling of the reaction solution, the dye precipitates as the piperidinium salt on addition of ether. M.P. 148–152° C. The dye can be recrystallized from isopropanol.

DYE III 10 g. of 1-(4'-sulfophenyl)-3-methylpyrazolone and
13.5 g. of 2,4-bis-hexyl-thiobenzaldehyde (B.P.$_{.1\ mm.}$: 193–194° C.) are heated under reflux for one hour with
3.5 g. of piperidine in
50 cc. of isopropanol. The piperidinium salt of the dye precipitates on cooling and after recrystallization from isopropanol it melts at 110–111° C.

The dyes according to the invention can be used with any conventional photographic material containing one or more light-sensitive silver halide emulsion layers.

When used in anti-halation layers, the layers containing the dyes according to the invention may be applied to either or to both sides of the support. The layers may be arranged both on the rear surface of the support and between the support and a light-sensitive layer.

As supports for the photographic layers the usual film-forming polymers can be employed, e.g., foils of cellulose esters, polycarbonates, especially of bis-phenol alkanes, and polyesters, especially those on the basis of polyethylene terephthalate.

Gelatin is preferably used as the binder for the dye-containing layers although this may be partly or completely replaced by other hydrophilic binders such as polyvinyl alcohols, poly-N-vinylpyrrolidone, carboxymethylcellulose, in fact any cellulose derivatives, alginic acids or derivatives such as alkali salts and esters thereof and others. In practice the dyes according to the invention are first dissolved, in the usual manner, in water or in a mixture of water and a water miscible solvent, such as a low molecular weight alcohol and are then added to the casting solution for the layer. The layers containing the dyes are applied according to common practice and dried. The final layers contain the dyes in quantities of 100 to 1000 mg. per m.$^2$.

The dyes used according to the invention are particularly easily and rapidly decolorized by the use of the usual photographic processing processes. In contrast to the known dyes of this type, they do not require treatment in additional baths in order to remove them.

EXAMPLE 3 g. of dye I are dissolved in 20 cc. of methanol, 480 cc. of water are added and this solution is then stirred into 500 cc. of a 5% gelatin solution. This dye solution is applied to one side of each of two samples of a cellulose acetate support.

A layer is a blue-sensitive gelatino-chlorobromide emulsion is now applied to both samples. With one sample it is applied to the non-coated surface, the layer of dye in that case acting as non-curling and anti-halation layer. With the other sample, the light-sensitive layer is applied to the dyed layers. The dyed layer is thus arranged between the support and the emulsion layer.

Both samples are exposed to a test wedge in a sensitometer customarily employed in the art treated with a developer solution of the following composition:

| | |
|---|---|
| p-Methylaminophenol _____ g__ | 5 |
| Hydroquinone _____ g__ | 6 |
| Anhydrous sodium sulfite _____ g__ | 40 |
| Potassium carbonate _____ g__ | 40 |
| Potassium bromide _____ g__ | 2 |
| Water _____ cc__ | 1000 |

After fixing, the two samples are rinsed in water. The dyed layers are in both cases completely and irreversibly decolorized.

Microscopic examination of the cross-section of the above materials shows that the dye is completely fast to diffusion.

We claim:

1. Light-sensitive photographic material comprising at least one silver halide emulsion layer and in antihalatron or filter layer dyed with an amount of a diffusion-resistant condensation product of a pyrazolone and an alkylmercaptobenzaldehyde wherein the condensation product contains at least a diffusion inhibiting radical and an acid group so that the condensation product is effective to impart to the last-mentioned layer the desired light-absorbing characteristics.

2. Light-sensitive photographic material as defined in claim 1, wherein dyeing is with a dye having the following formula:

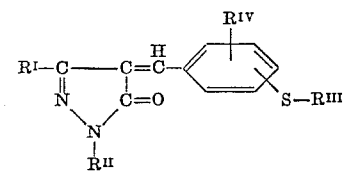

wherein:
$R^I$ = (1) alkyl, (2) a radical of the phenyl or naphthyl series, (3) an amino group, (4) carboxyl, (5) esterified carboxyl or (6) cycloalkyl;
$R^{II}$ = aryl or a heterocyclic group;
$R^{III}$ = an alkyl group having up to 18 carbon atoms, and
$R^{IV}$ = hydrogen atom, alkyl, alkylmercapto containing up to 18 carbon atoms, halogen, sulfo, alkoxy or phenoxy.

3. Light-sensitive photographic material as defined in claim 1, wherein dyeing is with a dye having the following formula:

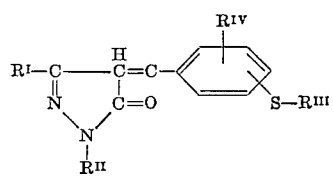

wherein:
$R^I$ = an alkyl group containing up to 18 carbon atoms;
$R^{II}$ = sulfophenyl;
$R^{III}$ = an alkyl group having up to 18 carbon atoms, and
$R^{IV}$ = hydrogen atom, alkyl, alkylmercapto containing up to 18 carbon atoms, halogen, sulfo, alkoxy or phenoxy.

4. Light-sensitive photographic material as defined in claim 3, characterized in that $R^{IV}$ represents an alkylmercapto group which contains up to 18 carbon atoms.

5. Light-sensitive photographic material as defined in claim 4, wherein the dye has the following formula:

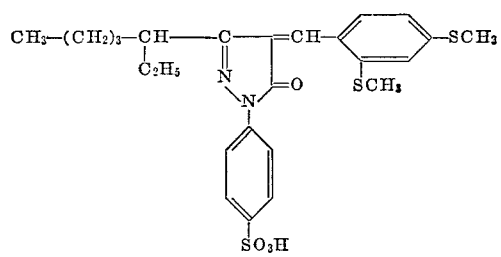

6. Light-sensitive photographic material as defined in claim 4, wherein the dye has the following formula:
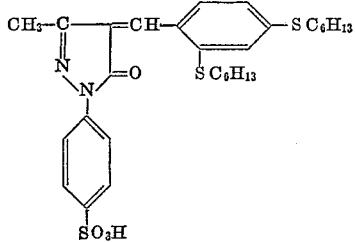
References Cited
UNITED STATES PATENTS
| 2,688,540 | 9/1954 | Ganguin et al. | 96—84 XR |
| 2,688,541 | 9/1954 | Ganguin et al. | 96—84 XR |
| 2,709,136 | 5/1955 | Ganguin et al. | 96—84 XR |
| 3,316,091 | 4/1967 | Rossi et al. | 96—84 |
FOREIGN PATENTS
| 758,537 | 5/1967 | Canada. |
| 852,141 | 10/1960 | Great Britain. |
NORMAN G. TORCHIN, Primary Examiner
R. H. SMITH, Assistant Examiner
U.S. Cl. X.R.
260—240.9